United States Patent [19]

Reinnagel

[11] 3,714,564

[45] Jan. 30, 1973

[54] DROPLET SIZING AND DETECTING APPARATUS AND METHOD USING A MAGNETIC RECORDING

[75] Inventor: Richard E. Reinnagel, Elma, N.Y.

[73] Assignee: Cornell Aeronautical Laboratory Inc., Buffalo, N.Y.

[22] Filed: Feb. 25, 1971

[21] Appl. No.: 118,749

[52] U.S. Cl.........324/71 CP, 73/432 PC, 235/92 PC, 250/222 M, 324/34 R, 346/74 MP

[51] Int. Cl...............................................G01n 27/00

[58] Field of Search............324/71 PC, 34 R, 34 TA; 73/432 PS; 235/92 PC; 250/222 M; 346/74 M, 74 MA

[56] References Cited

UNITED STATES PATENTS

| | | | |
|---|---|---|---|
| 3,311,903 | 3/1967 | Lee, Jr. | 346/74 M |
| 3,390,229 | 6/1968 | Williams | 250/222 PC |

OTHER PUBLICATIONS

Wheeler et al., Meas. of the Size Distribution of Spray Particles Elec. Eng., Oct. 1953; pp. 402–406.

*Primary Examiner*—Robert J. Corcoran
*Attorney*—Allen J. Jaffe

[57] ABSTRACT

An aerosol droplet detecting and sizing apparatus and method which comprises exposure to an aerosol of a portion of magnetic recording tape, the binder of which is soluble in the droplet material and noting the change in a prerecorded signal on the tape in response to the attack thereof by the droplet.

11 Claims, 4 Drawing Figures

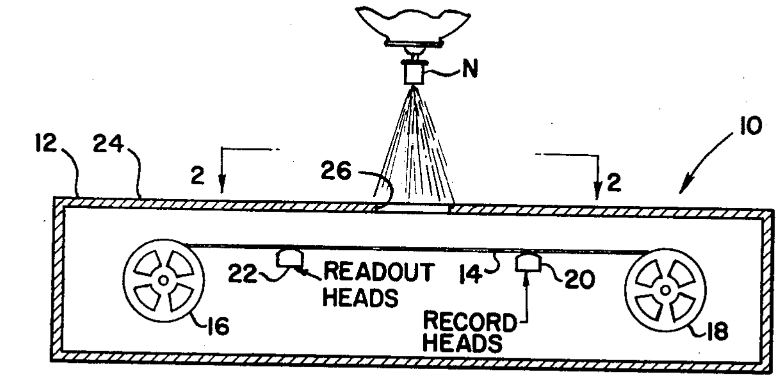
FIG. 1
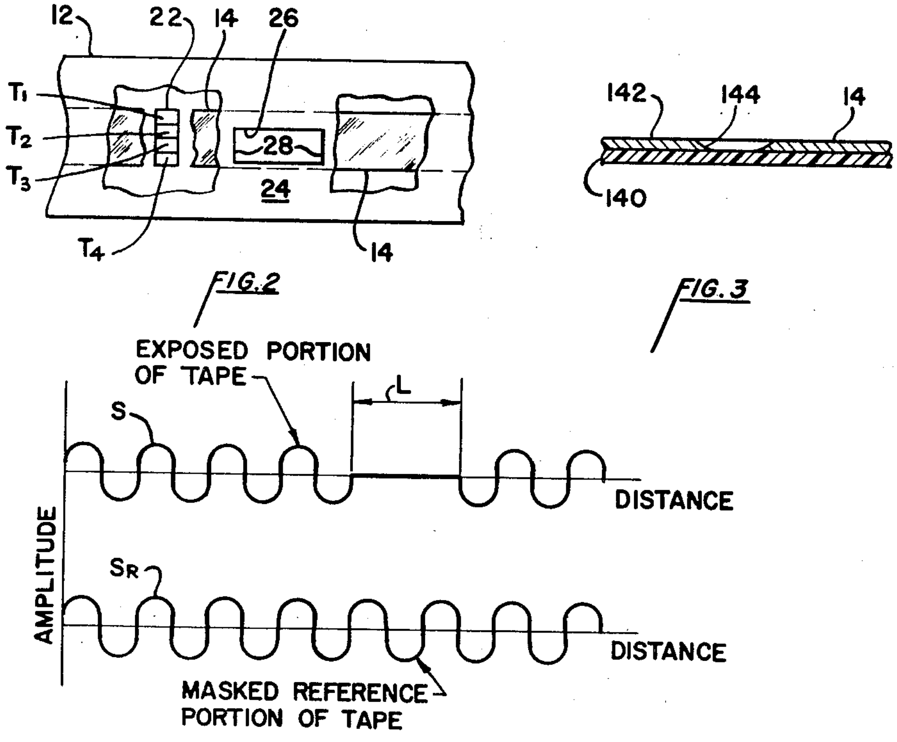
FIG. 2, FIG. 3
FIG. 4
RICHARD E. REINNAGEL
INVENTOR
BY [signature]
ATTORNEY

DROPLET SIZING AND DETECTING APPARATUS AND METHOD USING A MAGNETIC RECORDING

BACKGROUND OF THE INVENTION

The present invention relates to particle or liquid droplet detecting and sizing apparatus method and, more particularly, to an apparatus and method employing magnetic recording tape as the detection medium.

The measurement of liquid droplets in the range of 50 to 500 microns in aerosol sprays has been a problem of long standing for the aerosol industry. Instrumentation that has been developed for this task is generally cumbersome and extremely costly to operate in terms of man power required for data reduction.

Perhaps the most common prior art system in use is of the coated slide or paper type wherein the aerosol droplet attacks the coating and leaves a stain, the size of which being related to the mass of the droplet. The slide or paper is generally visually scanned and recorded, the data derived from which requiring skillful and time consuming analysis.

SUMMARY OF THE INVENTION

The present invention presents a novel technique for the sizing and detection of droplets from aerosol sprays or the like.

Basically, according to the present invention one or more tracks of a magnetic recording medium, such as tape, is exposed to the aerosol droplets, the recording medium having a binder which is either fully or partially dissolved by the droplet whereby a prerecorded signal on the recording medium is distorted or removed in the area of contact with the droplet. A second similarly recorded track which is protected from exposure to the aerosol droplets may be used as a reference track to be compared with the exposed track or tracks; the difference in signals between the exposed track or tracks and the unexposed track being a function of the droplet size.

BRIEF DESCRIPTION OF THE DRAWING

For a fuller understanding of the present invention, reference should now be had to the following detailed description of the same taken in conjunction with the accompanying drawings, wherein;

FIG. 1 is a schematic sectional view illustrating the technique of the present invention;

FIG. 2 is a view taken along line 2—2 of FIG. 1 with parts thereof broken away;

FIG. 3 is an enlarged fragmentary sectional view of the magnetic recording medium; and FIG. 4 is an illustration of typical signals on the exposed and unexposed portions of the recording medium.

DESCRIPTION OF THE PREFERRED EMBODIMENT

Referring now to the drawings and, more particularly, to FIGS. 1 and 2, the droplet detector is illustrated schematically and depicted generally by the numeral 10. The detector comprises a substantially hollow enclosure 12 within which is housed the magnetic recording medium such as magnetic recording tape 14. Suitable means for moving the tape such as spools 16 and 18 may be provided.

Electronic sensing means in the form of conventional record head 20 and readout head 22 are provided in contact with the tape 14 as schematically illustrated. Readout head 22 is preferably multi-tracked, for a reason to become apparent hereinbelow, and, accordingly for illustrative purposes, four tracks $T_1$, $T_2$, $T_3$ and $T_4$ are illustrated. Each track spans approximately one quarter the width of the tape 14. Record head 20 would have the same total track width as readout head 22.

An upper horizontal surface 24 of enclosure 12 contains a rectangular opening or cutout 26, the short sides 28 of which span approximately three quarters of the width of tape 14. Thus an aerosol spray from any source such as nozzle N will impinge on about three quarters of the width of tape 14 as it traverses opening or cutout 26. This width of tape aligns itself with tracks $T_2$, $T_3$ and $T_4$ and any disturbance of the signals in this area caused by the aerosol will be read by tracks $T_2$, $T_3$ and $T_4$ of head 22; whereas, the quarter width of tape under track $T_1$ is unexposed to the aerosol and its signal will be unaffected by the aerosol. Accordingly, track $T_1$ can function as a reference track.

An enlarged fragmentary sectional view of a typical magnetic recording tape is illustrated in FIG. 3 and comprises essentially a base layer 140 and a binder layer 142 containing the magnetic particles. When the binder layer 142 is soluble in the droplets of the aerosol spray, the droplets attack the binder in the area of contact therewith, resulting in a reorientation of the magnetic particles in the binder or even a substantial elimination of the binder and the formation of a crater or hole 144, the diameter of which is a function of the size of the droplet.

As illustrated in FIG. 4 if the tape is prerecorded with an a. c. signal S the contact area depicted by L would have little or no signal due to the action of the droplets on the binder. The reference signal $S_R$ is illustrated below signal S. This signal is recorded on the shielded portion of the tape above track $T_1$ and it therefore is unaffected by the aerosol droplets. A comparison between the reference signal and the exposed signal will yield data which is a function of the droplet sizes. The three exposed tracks $T_2$, $T_3$ and $T_4$ permit the sensing of droplets that may not be centered in one track width and which overlap one or more tracks.

With respect to the nature of the droplet material and the particular binder incorporated in the tape, it has been found that commercially available magnetic tapes such as 3M 102, 111 and 120 are attacked by Bis (2-ethylhexyl) hydrogen phosphite and Tris (2-ethylhexyl) phosphate. In some instances where the signals were not completely removed from the tape during the exposure to the droplets, it might be necessary to process the tapes in a suitable solvent such as ethyl alcohol or carbon tetrachloride, which affect the area of tape impacted by the droplet but have little effect on the remainder of the tape binder or coating.

The above examples are to be treated as only exemplary since it is a relatively simple matter to utilize a binder which is known to be soluble in the droplet material of interest. Therefore, many other combinations of binder and droplet material are possible. Although an a. c. bias for the tape is illustrated in FIG. 4, a d. c. bias would function equally as well.

While a preferred embodiment of the present invention has been disclosed and described changes will occur to those skilled in the art; therefore, it is intended that the invention is to be limited only by the scope of the appended claims.

I claim:

1. The method of detecting and sizing droplets comprising the steps of:

1. exposing at least a portion of a magnetic recording medium having a prerecorded signal to droplets to be detected, said magnetic recording medium having a binder which is soluble in the droplet such that said prerecorded signal is at least distorted when said droplet contacts said binder, and
2. detecting the effect of said distortion by comparing the first mentioned prerecorded signal with a second signal similar thereto which has not been effected by said droplets.

2. The method according to claim 1, wherein;

3. said magnetic recording medium is recording tape.

3. The method according to claim 1, wherein said second signal is recorded on said magnetic recording medium adjacent said first mentioned prerecorded signal.

4. The method according to claim 3, wherein;

3. said magnetic recording medium is recording tape.

5. Apparatus for detecting and sizing droplets, comprising;

1. a magnetic recording medium containing a prerecorded signal, and having a binder which is soluble in the droplet material,
2. means for exposing at least a portion of said magnetic recording medium to the droplets to be detected such that said prerecorded signal is at least distorted when said droplets contact said binder,
3. a second signal prerecorded on a magnetic recording medium similar to said first mentioned signal, and
4. means for comparing said second signal with said first mentioned signal to detect the distortion of said first mentioned signal.

6. The apparatus according to claim 5, wherein;

5. said magnetic recording medium comprises magnetic recording tape.

7. The apparatus according to claim 5, wherein;

5. said means for exposing comprises a substantially rectangularly shaped opening in an enclosure, the width of which opening being less than the width of said magnetic recording medium, and
6. said means for comparing comprises a multi-tracked readout head which is in contact with and spans the width of said recording medium corresponding to the width thereof that is spanned by said opening.

8. The apparatus according to claim 7, wherein;

7. said multi-tracked readout head includes at least one additional track which is in contact with and spans an unexposed portion of said magnetic recording medium containing said second signal.

9. The apparatus according to claim 8, further comprising;

8. means for recording said signals on said recording medium on the exposed and unexposed portions thereof.

10. The apparatus according to claim 9, wherein;

9. said means for recording comprises a multi-tracked recording head.

11. The apparatus according to claim 10, wherein;

10. said magnetic recording medium comprises magnetic recording tape.

* * * * *